Patented Apr. 30, 1946

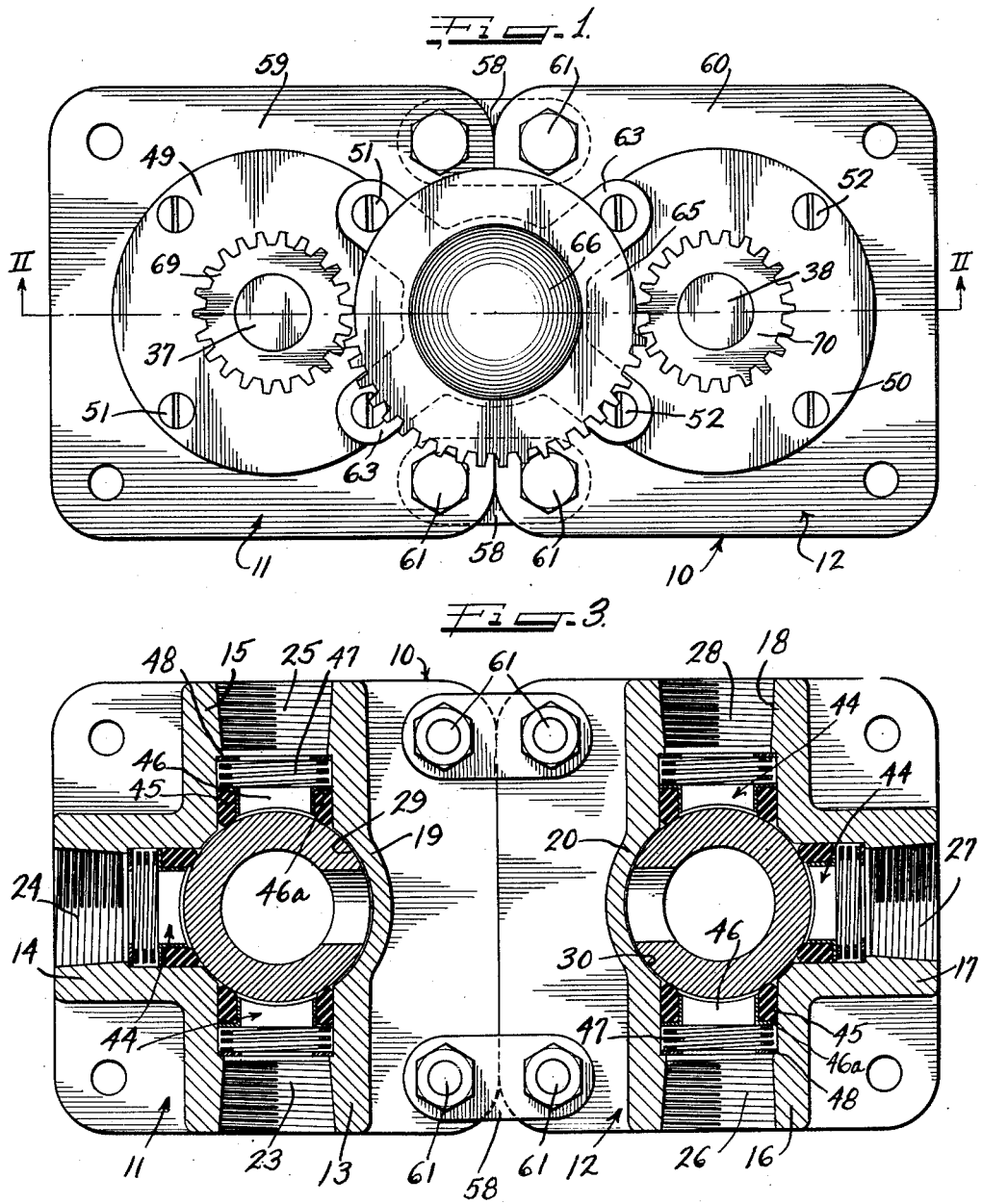

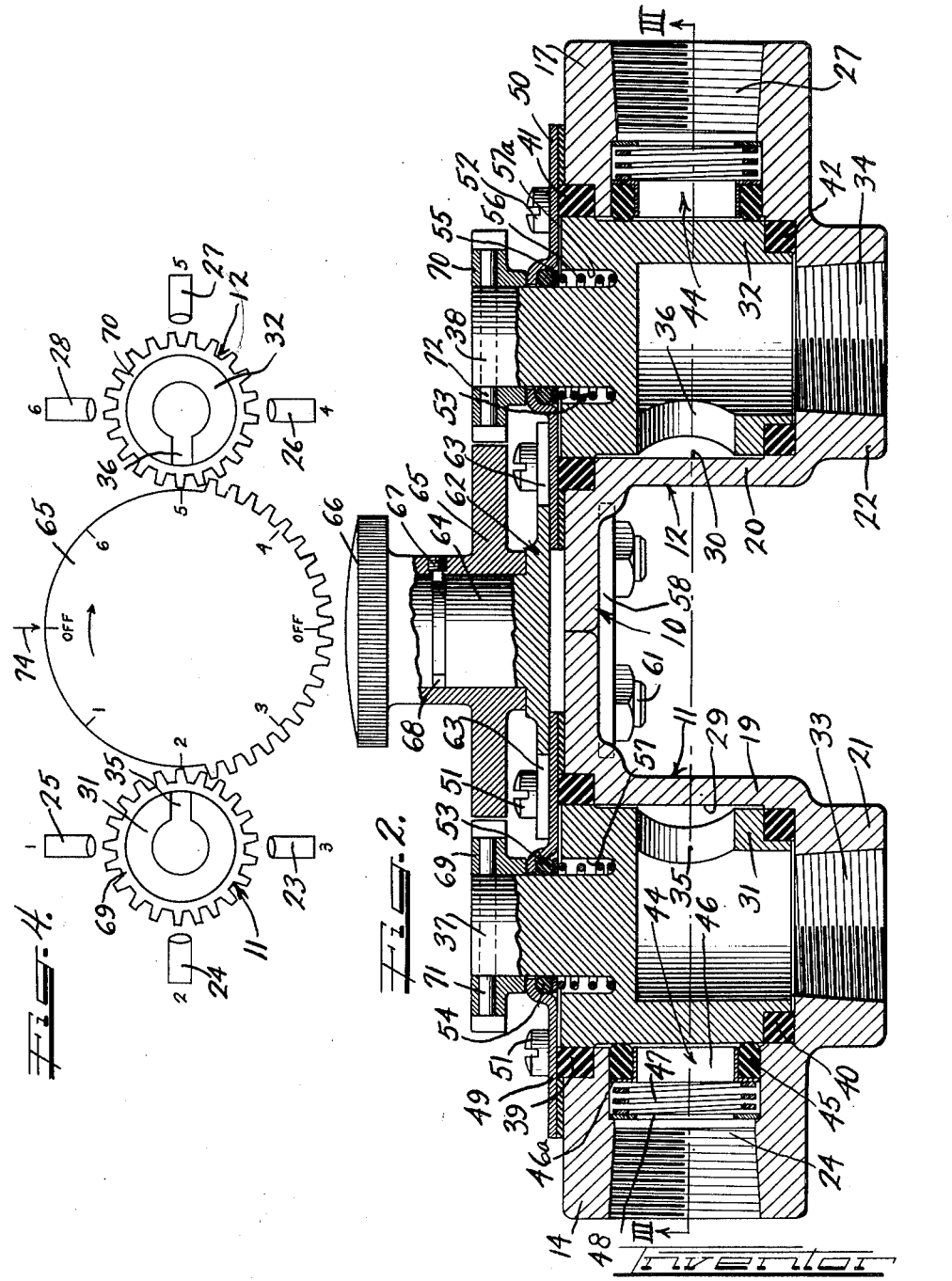

2,399,460

UNITED STATES PATENT OFFICE 2,399,460

MULTISELECTOR VALVE MECHANISM

Karl B. Britton, Bratenahl, Ohio, assignor to Thompson Products, Inc., a corporation of Ohio Application February 3, 1944, Serial No. 520,879

5 Claims. (Cl. 137—144)

This invention relates to flow control devices and means for controlling the same. More particularly the invention relates to a mechanism for selectively controlling a plurality of valves.

Where a large number of separate fluid supply sources or storage means are provided and it is desired to control the flow of fluid from such sources to one or more destinations, it has heretofore been necessary to construct a special unit with the required number of inlet ports each time the number of sources and the operating conditions are varied. The apparatus of the present invention has been devised with a view to alleviating this necessity. The excessive cost of producing special units as well as the size of such devices for accomplishing the desired results has required the use of a multiple number of smaller flow control devices which must be independently operated and controlled. The instant invention contemplates the construction of apparatus embodying a cooperative arrangement of a plurality of small standard units to produce the desired results, thereby avoiding the necessity of designing special equipment.

One of the principal problems in employing a plurality of smaller standard units has been the difficulty of providing a satisfactory control mechanism for manipulating the several units in complete cooperation with each other to accomplish the same purpose as would be accomplished by a single multiple position flow control device. The present invention contemplates a control mechanism for the cooperative manipulation of a plurality of small standard fluid flow control devices and effectively solves problems experienced in the operation of a plurality of such individual units in the proper sequence to effect the desired results.

It is an object of the present invention, therefore, to provide an arrangement of a plurality of standard units for the control of fluid from a plurality of supply sources to one or more devices which are adapted to receive and utilize such fluid.

It is a further object of the present invention to provide a suitable control mechanism for operating a plurality of fluid flow control devices according to a predetermined schedule of operations and in cooperative relation with respect to each other.

It is a still further object of the present invention to provide a means associated with the several units which will provide the desired operating relationship between the several units with which the means are to be associated.

Another object of the present invention is to provide a fluid flow control device having a plurality of operating positions to accomplish certain operational steps in the operation of the apparatus with which it is associated.

Another and still further object of the present invention is to provide a form of mechanism which will produce the desired efficiency of operation and is capable of being manufactured economically.

The mechanism of the present invention is particularly advantageously adapted to the manipulation of the fuel supply in an airplane. For the sake of clarification but in no sense a limitation, the invention will be described hereinafter as being applied in controlling the delivery of gasoline from a plurality of storage tanks located for example in the wings and various parts of the fuselage of an airplane to a single engine.

In such circumstances, it is highly desirable to have a centrally controlled means for opening and closing the fuel lines and directing the flow of gasoline as desired from one or more supply tanks to the engine or engines in order that the engine or engines can continue to function. Such centrally controlled means may either be manipulated manually or may be actuated by some suitable mechanical or electrically operated contrivance for shifting the valve unit or units in opening and closing the individual supply lines.

The invention will best be understood from an inspection of one of the embodiments of the invention shown in the accompanying drawings in which:

Figure 1 represents a plan view of one form of mechanism embodying the principles of the present invention and illustrating the use of a pair of selector valve units in combination with a control mechanism for operating the same;

Figure 2 is a vertical section taken along the line II—II of Figure 1 with parts in elevation and broken away;

Figure 3 is a horizontal cross-section taken along the line III—III of Figure 2; and Figure 4 is a diagrammatic view illustrating the mode of operation of the unit illustrated in Figures 1 to 3, inclusive.

Referring first to Figures 1 to 3, inclusive, of the drawings, it will be noted that the control unit 10 comprises a pair of selector cocks 11 and 12. Each selector cock 11, 12, has a plurality of bosses 13, 14, 15 and 16, 17, 18, respectively, arranged in substantially radially disposed relation about the casings 19 and 20, thereof, together with a boss 21, 22, respectively, in the base of said casing. The bosses 13, 14, 15 and 16, 17, 18 are provided with inlet passages 23, 24, 25 and 26, 27, 28, respectively, extending therethrough and connecting with internally disposed generally cylindrical chambers 29 and 30 of selector cocks 11 and 12, respectively. The several inlet passages may be internally threaded, as shown, or provided with any other suitable forms of connections to receive a plurality of conduits.

Plugs or valve members 31, 32, of generally cylindrical form are advantageously mounted for rotation in chambers 29, 30 of casings 19, 20, respectively. The plugs 31 and 32 have hollow interiors open at the base thereof to communicate with outlet passages 33, 34 associated with the bosses 21 and 22 of the casings 19 and 20, respectively. These outlet passages may be connected so as to supply a single engine or receptacle or may be independent to feed a plurality of engines or receptacles.

The plugs 31, 32 are provided with ports 35, 36 extending therethrough and adapted to register with one of the inlet passages 23, 24, 25 or 26, 27, 28, respectively, as the case may be, when said plugs are rotated in chambers 29 and 30, respectively.

Plugs 31 and 32 are provided with stem portions 37 and 38, respectively, and are rotatably mounted in the chambers 29 and 30 of their respective casings, 19 and 20, being supported therein by bearing rings 39, 40 and 41, 42 disposed adjacent the top and bottom of the chambers 29, 30. The plug member 31, 32, in each case, is advantageously disposed in spaced relation with respect to the walls of its chamber. A suitable sealing assembly 44 is provided for each of the several inlet passages in each of the selector cocks 11 and 12. Each sealing assembly 44 comprises an annular seal 45 mounted about a collar member 46 against the flanged portion 46a of which is disposed a coil spring 47 held in place at its opposite end by a snap ring 48 seated against a shoulder formed internally of each inlet passage with which the assembly is associated.

The selector cocks 11 and 12 are provided with cover plates 49 and 50 which are apertured to permit the stem portions 37 and 38 of the plugs 31 and 32 to extend therethrough. Any suitable form of gasket may be employed to seal the junction of the cover plates 49 and 50 with their respective casings 19 and 20. The cover plates 49 and 50 may advantageously be demountably secured to the casings 19 and 20 as by means of machine screws 51 and 52, respectively. Leakage about the stem portions 37 and 38 is prevented by the provision of sealing assemblies 53 each of which comprises a packing ring 54, washer 55 and a coil spring 56 of which the latter is seated in an annular groove 57, 57a formed in the plug 31, 32 surrounding the base of its stem portion 37, 38.

The selector cocks 11 and 12 of the unit 10 are adapted to be mounted adjacent each other on a suitable panel structure or they may conveniently be provided with any suitable form of mounting which will afford the requisite cooperative relationship between the individual parts to enable them to be controlled by a unitary control mechanism. One form of mounting is shown in the illustrated embodiment of the instant invention and contemplates the use of a pair of links 58 secured to the mounting flanges 59 and 60 of the casings 19 and 20, respectively, as by the bolts 61. A cross member or X-shaped member 62 is also provided having a plurality of feet 63 which are adapted to be secured to selector cocks 11 and 12 by the machine screws 51 and 52 which also serve to hold in place the respective cover members 49 and 50.

The cross member 62 has a vertically extending, centrally disposed post 64 upon which is rotatably mounted a control disk 65. The control disk 65 is provided with a suitable handle or knob 66 and has a set screw 67 threaded therein, the end of which registers with an annular groove 68 in the post 64 of the cross member 62 to permit its removal for disassembly of the unit. Gear teeth are formed on a portion of the periphery of the control disk 65 over a circular arc which subtends an angle of slightly less than 180 degrees and are adapted to alternately engage the teeth of gears 69 and 70 secured as by means of the pins 71 and 72 to the stem portions 37 and 38 of the plugs 31 and 32, respectively. The disk 65 has twice the diameter of gears 69 and 70 so that the gear teeth on half of its periphery will successively mesh with the teeth on gears 69 and 70 to successively rotate each gear 69 and 70 a full turn for each full turn of the disk.

The operation of the unitary control mechanism of the present invention as applied to a fluid flow control unit embodying two individual selector cocks will be best understood from an inspection of the diagrammatic showing of Figure 4. As previously indicated, the control disk 65 is adapted to have gear teeth on a portion of its periphery which mesh with the gears 69 and 70 which rotate the plugs 31 and 32 of the selector cocks 11 and 12, respectively, in accordance with the desired operation of the units.

In the illustrated arrangement, the control mechanism is adapted to provide two off positions at which, when the control disk 65 registers with a suitable indicator 74 (Figure 4) associated therewith, both plugs 31 and 32 of the selector cocks 11 and 12 will be positioned with their respective ports 35 and 36, as indicated by the outlines of the plugs superimposed on the webs of the gears 69 and 70, opposite the blank wall portions of their casings 19 and 20. By rotating the control disk 65 for example, in the direction indicated by the arrow thereon until each of the numerals on said disk registers, in turn, with the indicator 74, each of the inlet passages, 23, 24, 25 of the selector cock 11 and inlet passages 26, 27, 28 of the selector cock 12 will be connected with their respective outlet passages 33 and 34 through the hollow interior of the plugs 31 and 32.

For example, when the control disk 65 is rotated in a clockwise direction, the numeral 1 on the disk will assume a position opposite the indicator 74, the plug 31 will be rotated, and its port 35 will be disposed at its first position, namely in communication with inlet passage 25 (which is indicated as being the first position on the selector cock 11 in Figure 4). As the control disk 65 is rotated in a clockwise direction from the position shown in Figure 4, the gear 70 which is adapted to rotate the plug 32 will remain stationary since that portion of the control disk 65 which has no teeth will be passing the gear 70 and only the teeth on the gear 69 will be meshing with the teeth on the control disk 65, thereby causing the rotation of the plug 31. If the rotation of the control disk 65 is continued in a clockwise direction indicated by the arrow thereon, however, the teeth on the control disk 65 will eventually cause the gear 69 to rotate the plug 31 of the selector cock 11 to position its port 35 in communication with inlet passages 24 and 23 (which are designated as being positions 2 and 3, respectively).

When the port 35 of the plug 31 is once again disposed in the position indicated in Figure 4, the selector cock 11 will be shut off and the gear teeth on the control disk 65 will then be positioned on the upper side thereof and the off position diametrically opposite that shown in the drawing as registering with the indicator 74 will then be positioned in registry with said indicator. At this point, both selector cocks 11 and 12 will be positioned at their off positions as illustrated and the continued rotation of the control disk 65 will now cause the teeth thereon to mesh with the teeth of the gear 70 for the rotation of the plug 32 of selector cock 12.

As in the case of the operation of the selector cock 11 previously described, the port 36 in the plug 32 will be brought into communication with inlet passages 26, 27 and 28 of the selector cock 12 representing positions 4, 5 and 6, as indicated in Figure 4. It will be understood that, during the rotation of the control disk 65 for this cycle of operation, a portion of said disk without teeth will be passing the gear 69 and the plug 31 of the selector cock 11 will now be permitted to remain in its off position.

The present fluid flow control unit illustrated in Figures 1 to 3, inclusive, is adapted to provide, through its unitary control mechanism, for the interconnection of six different fluid supply sources with one or more delivery conduits which will direct the fluid to any desired destination. In the event that it is desired to employ a fewer number of inlets than the six illustrated, any one or more of the inlet passages may be provided with a tight fitting plug which will effectively close off such passages. It will be readily understood also that any desired number of individual selector cocks, or, in fact, any other type of fluid control device may be associated with the control mechanism of the present invention simply by providing the desired number of teeth on the control disk 65 to operate the individual units in accordance with a desired schedule of operations.

While two selector cocks operated by a single disk are specifically described herein with the disk having twice the diameter of the gears on the valve plugs so that 180° of gear teeth on the disk will rotate each plug gear a full turn, it should be understood that without departing from this invention any number of selector cocks could be symmetrically arranged around a disk or mutilated driving gear with the disk diameter increasing and the arc of gear teeth thereon decreasing in proportion to the increase in number of cocks. Thus three cocks disposed 120° apart around a disk leaving a diameter three times the diameter of the plug gears but only having 120° of gear teeth thereon would leave the plugs successively rotated one full turn for each full revolution of the disk.

It will of course be understood that various details of construction may be varied through a wide range without departing from the principles of this invention and it is, therefore, not the purpose to limit the patent granted hereon otherwise than necessitated by the scope of the appended claims.

I claim as my invention:

1. In combination, a plurality of valves each having a multi-ported casing and a plug rotatable therein for controlling flow between said ports, each plug having a driven gear secured thereon, means connecting said casings to position said driven gears in fixed spaced relation, and a driving gear rotatably carried by said casings between said driven gears and having teeth arranged for successively driving the driven gears for selective operation of said plugs to control flow through the ports of each casing.

2. In combination, a pair of valves each having a multi-ported casing and a plug rotatable therein for controlling flow between the ports of each casing, each plug having a circular gear secured thereto, each of said circular gears having radial gear teeth extending completely therearound, means connecting said casings to position said circular gears in fixed spaced lateral relation at a distance equal to the combined diameters of said circular gears, a driving gear mounting post carried by said casings midway between said circular gears, and a segmental circular gear rotatably mounted on said mounting post having radial teeth arranged for successively engaging said circular gears to first rotate one plug through its complete cycle of port flow-controlling positions and then rotate the other plug through its complete cycle of port flow-controlling positions.

3. In combination, a pair of valves each having a multi-ported casing with a mounting flange thereon and a plug rotatable therein for controlling flow between the ports, each of said plugs having a stem projecting from the casing beyond the mounting flange, each stem having a gear secured thereon adjacent said mounting flange, means connecting said mounting flanges in abutting relation to hold said gears in spaced lateral relation, and a single driving gear rotatably carried by the flanges between said laterally spaced gears, said driving gear having radial teeth arranged for successive driving engagement with the teeth of said laterally spaced gears to rotate the plugs in succession through their complete operating cycles.

4. In combination, a pair of valves each having a casing with an axial outlet port and a plurality of radial inlet ports together with a rotatable plug selectively controlling flow between the inlet ports and the outlet port, means securing said casings to hold the plugs in spaced lateral relation, the plug in each casing having a driven gear secured thereon, and a single driving gear rotatably mounted on an axis midway between said driven gears and having teeth thereon for successively engaging the driven gears to independently operate each plug through its complete cycle of port flow-controlling positions.

5. In combination, a pair of valves each having a plurality of radial inlet ports and a single axial outlet port together with a plug rotatably mounted therein for selectively controlling flow between the ports thereof, each of said plugs having a stem projecting from the casing, a gear on each stem having teeth extending completely therearound, means securing said casings together to hold said gears in spaced lateral relation, a mutilated gear rotatably mounted on said casings midway between said first mentioned gears for successive engagement therewith, and marking indicia on said mutilated gear for visibly indicating the port flow-controlling position of each plug.

KARL B. BRITTON.